US012798249B2

(12) United States Patent
Chen et al.

(10) Patent No.: US 12,798,249 B2
(45) Date of Patent: Nov. 17, 2026

(54) LIQUID DISCHARGE SYSTEM

(71) Applicants: Bingxian Chen, Kanagawa (JP); Tomoya Tanaka, Kanagawa (JP); Kento Aoki, Kanagawa (JP); Shigeru Yoshida, Kanagawa (JP)

(72) Inventors: Bingxian Chen, Kanagawa (JP); Tomoya Tanaka, Kanagawa (JP); Kento Aoki, Kanagawa (JP); Shigeru Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 128 days.

(21) Appl. No.: 18/848,131

(22) PCT Filed: Mar. 6, 2023

(86) PCT No.: PCT/IB2023/052058

§ 371 (c)(1),
(2) Date: Sep. 18, 2024

(87) PCT Pub. No.: WO2023/180837

PCT Pub. Date: Sep. 28, 2023

(65) Prior Publication Data

US 2025/0236110 A1 Jul. 24, 2025

(30) Foreign Application Priority Data

Mar. 23, 2022 (JP) ................................ 2022-046210

(51) Int. Cl.
*B41J 2/165* (2006.01)

(52) U.S. Cl.
CPC .. *B41J 2/16552* (2013.01); *B41J 2002/16558* (2013.01); *B41J 2002/1657* (2013.01); *B41J 2002/16594* (2013.01); *B41J 2202/05* (2013.01)

(58) Field of Classification Search
CPC .......... B41J 2/16552; B41J 2002/16558; B41J 2002/1657; B41J 2002/16594; B41J 2202/05
See application file for complete search history.

(56) References Cited

U.S. PATENT DOCUMENTS 10,414,165 B2 9/2019 Nishida et al.

FOREIGN PATENT DOCUMENTS

CN 108128033 A 6/2018
JP S58-043257 A 3/1983

(Continued)

OTHER PUBLICATIONS

International Search Report and Written Opinion issued on Jun. 1, 2023 in PCT/IB2023/052058 filed on Mar. 6, 2023, 10 pages.

(Continued)

*Primary Examiner* — Jason S Uhlenhake
(74) *Attorney, Agent, or Firm* — XSENSUS LLP

(57) ABSTRACT

A liquid discharge system includes: a head (300) including: a nozzle (302) from which a liquid is to be discharged; a liquid chamber (311) communicating with the nozzle through a communication port; a nozzle face (301) on which the nozzle is formed; and a valve (304) configured to open or close the communication port; and a cleaner (708) including a cleaning nozzle (201) to supply a cleaning liquid to the nozzle face, wherein the cleaner supplies the cleaning liquid from the cleaning nozzle to the nozzle face in a state where the valve has closed the communication port.

20 Claims, 16 Drawing Sheets

(56) References Cited

FOREIGN PATENT DOCUMENTS

| | | | | | |
|---|---|---|---|---|---|
| JP | S5843257 | A | * | 3/1983 | ........... B05B 15/555 |
| JP | 2005-035031 | A | | 2/2005 | |
| JP | 2005-074671 | A | | 3/2005 | |
| JP | 2006142621 | A | | 6/2006 | |
| JP | 2016013676 | A | | 1/2016 | |
| JP | 2016093944 | A | | 5/2016 | |
| JP | 2016155253 | A | * | 9/2016 | |
| JP | 2017001298 | A | | 1/2017 | |
| JP | 2018-012065 | A | | 1/2018 | |
| WO | 2012/060153 | A1 | | 5/2012 | |

OTHER PUBLICATIONS

Office Action issued Nov. 7, 2025 in Japanese Patent Application No. 2022-046210, 5 pages.

Office Action issued Jun. 10, 2026 in corresponding Chinese Patent Application No. 202380028280.4 (13 pages; with English translation).

* cited by examiner

LIQUID DISCHARGE SYSTEM

TECHNICAL FIELD

The present embodiment relates to a liquid discharge system.

BACKGROUND ART

Patent Literature (PTL) 1 discloses an inkjet recording head cleaner including a droplet discharger that discharges cleaning liquid droplets into a nozzle that into ink droplets of an inkjet recording head.

CITATION LIST

Patent Literature

[PTL 1]
Japanese Unexamined Patent Application Publication No. 2005-035031

SUMMARY OF INVENTION

Technical Problem

The conventional art has a drawback in which the cleaning liquid enters into the liquid chamber from the nozzle and causes dilution of the ink or paint inside the liquid chamber which leads to deterioration in coating quality.

Solution to Problem

A liquid discharge system includes: a head including: a nozzle from which a liquid is to be discharged; a liquid chamber communicating with the nozzle through a communication port; a nozzle face on which the nozzle is formed; and a valve configured to open or close the communication port; and a cleaner including a cleaning nozzle to supply a cleaning liquid to the nozzle face, wherein the cleaner supplies the cleaning liquid from the cleaning nozzle to the nozzle face in a state where the valve has closed the communication port.

Advantageous Effects of Invention

According to the present embodiment, a liquid discharge system can reduce the cleaning liquid that enters into the head.

BRIEF DESCRIPTION OF DRAWINGS

A more complete appreciation of embodiments of the present disclosure and many of the attendant advantages and features thereof can be readily obtained and understood from the following detailed description with reference to the accompanying drawings.

Figure 1:
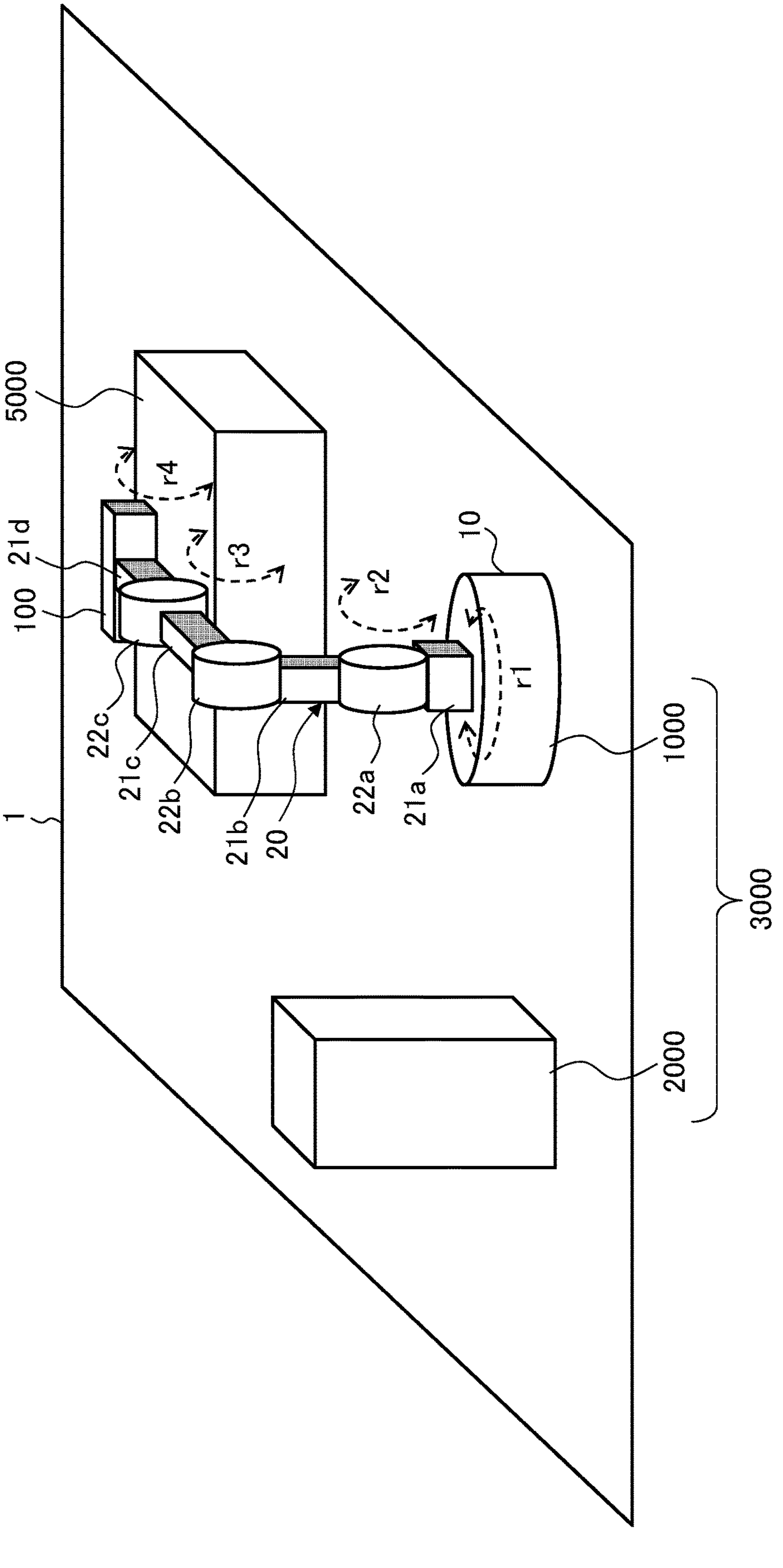
FIG. 1 is a schematic view illustrating the entirety of a liquid discharge system according to an embodiment of the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments for carrying out the present embodiment will be described with reference to the drawings. In the description of the drawings, the same elements are denoted with the same reference signs, and redundant description is not given.

[Overview of Liquid Discharge System]

First, an overview of a liquid discharge system will be described with reference to FIG. 1. FIG. 1 is a schematic view illustrating the entirety of the liquid discharge system according to an embodiment of the present embodiment. The liquid discharge system exemplified herein is a coating system for coating a vehicle body of an automobile.

In FIG. 1, a coating system 3000 includes a coating robot 1000 and a cleaning station 2000. The coating system 3000 is provided in a predetermined coating booth 1. The coating robot 1000 is, for example, an articulated robot including a robot arm having a leading end provided with a head unit 100. The coating robot 1000 can freely move the head unit 100 to a target object 5000 such as a vehicle body, and can accurately disposed a head (to be described later) that the head unit 100 provided with, at a position where coating is applied to the target object 5000.

For example, the coating robot 1000 includes a robot main body 10, an articulated arm device 20, and the head unit 100. The robot main body 10 is secured to the floor face of the coating booth 1 to support the articulated arm device 20. The robot main body 10 includes a robot controller 70 to be described later inside the robot main body 10.

The articulated arm device 20 includes a first arm 21*a*, a second arm 21*b*, a third arm 21*c*, a fourth arm 21*d*, a first joint 22*a*, a second joint 22*b*, and a third joint 22*c*. The first arm 21*a* has one end supported and turnable (swivelable) in the direction of the dotted arrow r1 with respect to the robot main body 10, and the other end connected to one end of the second arm 21*b* through the first joint 22*a*. The one end of the second arm 21*b* is connected to the first arm 21*a* through the first joint 22*a*, so that the second arm 21*b* is turnable in the direction of the dotted arrow r2.

The second arm 21*b* has the other end connected to one end of the third arm 21*c* through the second joint 22*b*. The one end of the third arm 21*c* is connected to the second arm 21*b* through the second joint 22*b*, so that the third arm 21*c* is turnable in the direction of the dotted arrow r3. The third arm 21*c* has the other end connected to one end of the fourth arm 21*d* through the third joint 22*c*. The one end of the fourth arm 21*d* is connected to the third arm 21*c* through the third joint 22*c*, so that the fourth arm 21*d* is turnable in the direction of the dotted arrow r4. The other end of the fourth arm 21*d* supports the head unit 100.

The robot controller 70 controls drive motors with which the joints 22*a* to 22*c* are provided one-to-one, leading to respective turning operations of the arms 21*a* to 21*d*. As a result, the head unit 100 can move vertically (upward and downward) and horizontally (leftward and rightward) with respect to the target object 5000.

The head disposed at the coating position discharges ink as an exemplary liquid to the target object 5000 to coat the target object 5000. The cleaning station 2000 is disposed within an area where the robot arm of the coating robot 1000 reaches. The coating robot 1000 moves the head unit 100 to the cleaning station 2000 in response to completion of the ink discharge or the elapse of a predetermined time. The cleaning station 2000 includes a cleaner for cleaning the head, and performs cleaning processing on the head that the head unit 100 is provided with.

[Hardware Configuration]

Figure 2:
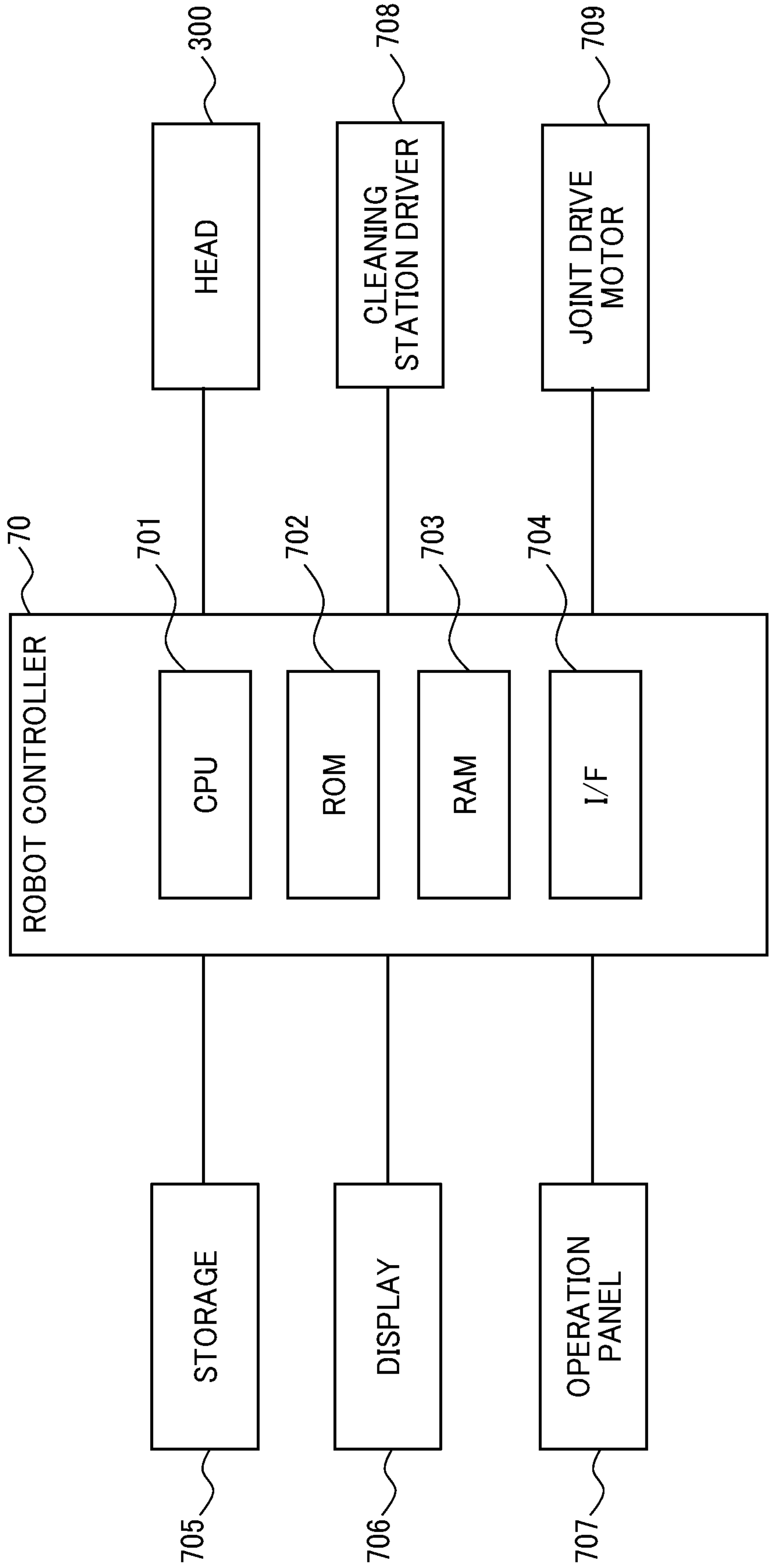
FIG. 2 is a block diagram illustrating an exemplary of a schematic configuration of hardware of a coating robot.

Next, a schematic configuration of hardware of the coating robot according to the embodiment will be described with reference to FIG. 2. In the hardware configuration in FIG. 2, constituent elements may be added or deleted. FIG. 2 is a block diagram illustrating an exemplary schematic configuration of the hardware of the coating robot 1000.

The coating robot 1000 includes the robot controller 70 inside the robot main body 10. The robot controller 70 may be provided outside the robot main body 10, or may be provided as a device separate from the coating robot 1000.

The robot controller 70 includes a central processing unit (CPU) 701, a read only memory (ROM) 702, a random access memory (RAM) 703, and an interface (I/F) 704.

The CPU 701 controls the entirety of the coating robot 1000. The CPU 701 is a computing device that reads a program or data stored in, for example, the ROM 702 or a storage 705 onto the RAM 703, and executes processing to achieves each function of the coating robot 1000.

The ROM 702 is a non-volatile memory that can hold a program or data even when the power is turned off. The RAM 703 is a volatile memory to be used as a work area of the CPU 701. The I/F 704 is an interface for input and output of characters, numerical values, or various instructions to and from various external devices. The I/F 704 controls display of various types of information such as a cursor, a menu, a window, a character, or an image on a display 706 such as a liquid crystal display (LCD). The storage 705 stores various types of data such as programs.

The display 706 displays various types of information such as a cursor, a menu, a window, a character, or an image. An operation panel 707 is a type of input device for input of characters, numerical values, or various instructions; selection or execution of various instructions; selection of a processing target; or movement of a cursor.

A head 300, a cleaning station driver 708, a joint drive motor 709, and others are connected to the robot controller 70. The head 300 performs a liquid discharge operation to the target object 5000 on the basis of a command from the CPU 701. In cleaning of a nozzle face 301 that the head 300 has, the cleaning station driver 708 moves the head 300 to a sealing member 205 that the cleaning station 2000 has, on the basis of a command from the CPU 701. The joint drive motor 709 drives, on the basis of a command from the CPU 701, the joints 22*a* to 22*c* of the articulated arm device 20 of the coating robot 1000 to perform the respective turning operations of the arms 21*a* to 21*d*.

[Issues on Head Cleaning]

Figure 3A:
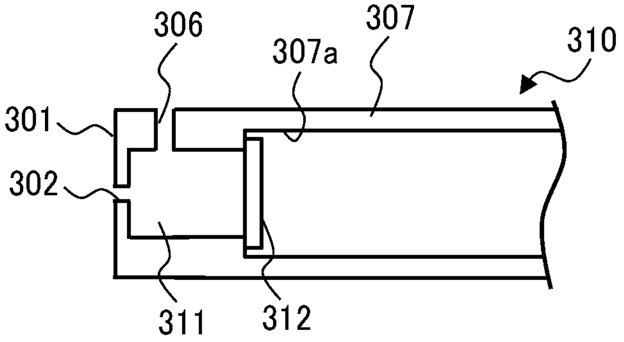
FIGS. 3A and 3B are schematic explanatory views of the discharge principle of a piezoelectric head.
Figure 3B:
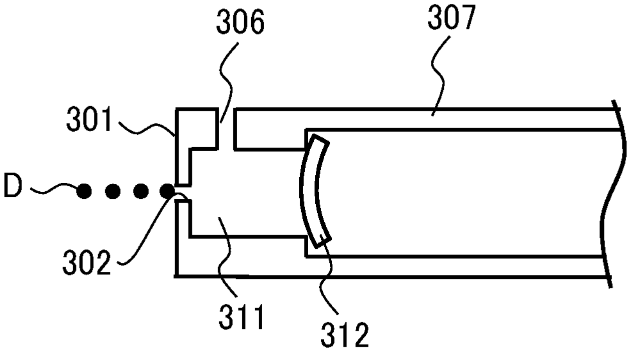
Figure 4A:
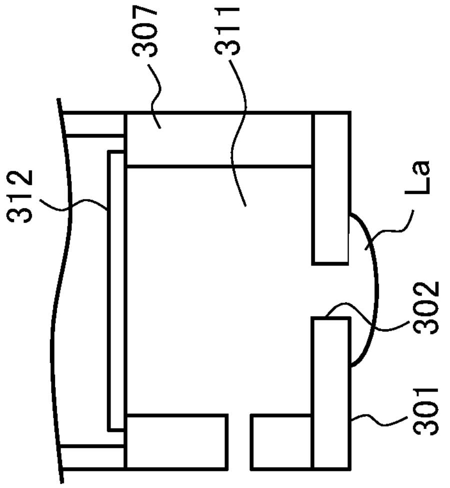
FIGS. 4A to 4C are explanatory views illustrating a nozzle contamination of the piezoelectric head.
Figure 4B:
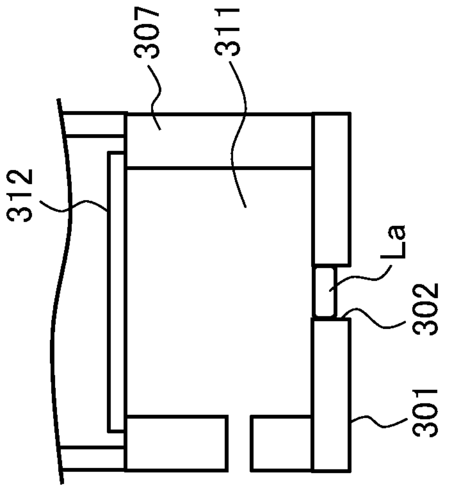
Figure 4C:
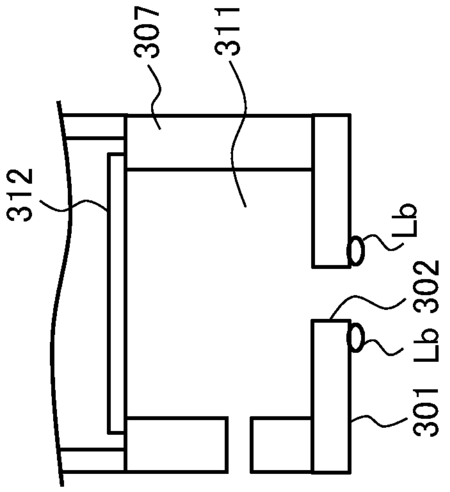
Figure 5A:
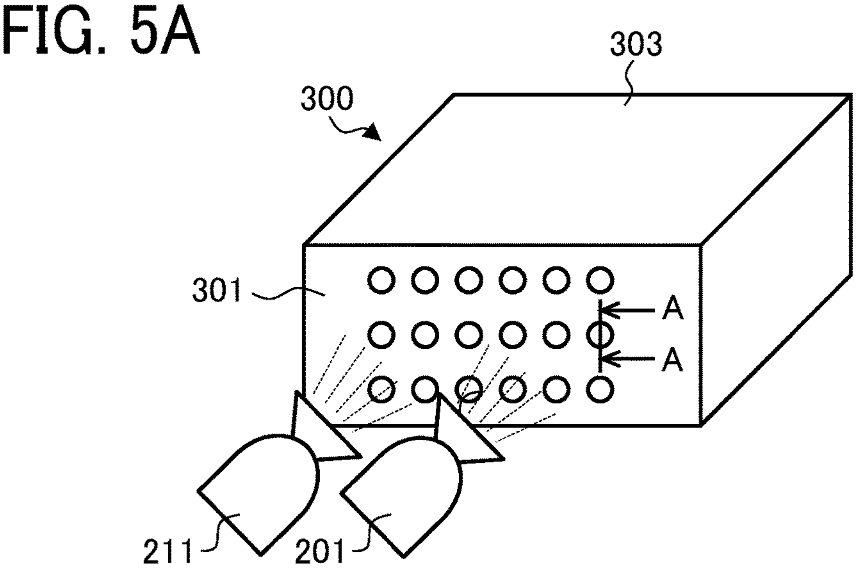
FIGS. 5A and 5B are explanatory views illustrating cleaning of the piezoelectric head.
Figure 5B:
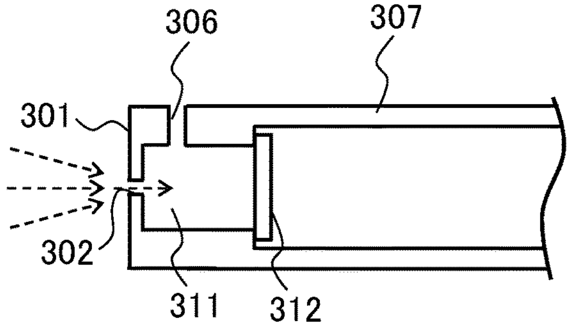

Here, issues at the time of head cleaning for a piezoelectric head will be described with reference to FIGS. 3A to 5B. FIGS. 3A and 3B are schematic explanatory views of the discharge principle of the piezoelectric head. FIGS. 4A to 4C are explanatory views illustrating a nozzle contamination of the piezoelectric head. FIGS. 5A and 5B are explanatory views illustrating cleaning of the piezoelectric head.

FIG. 3A illustrates that no liquid is discharged, and FIG. 3B illustrates a liquid is being discharged. The piezoelectric head is a head that causes a piezoelectric element 312 to vibrate with a liquid chamber 311 filled with a liquid to push out the liquid in the liquid chamber 311. Thus the liquid is discharged from a nozzle 302. For example, the piezoelectric head includes the head 300 in FIG. 5A having a housing 303 incorporating such a piezoelectric mechanism 310 as in FIGS. 3A and 3B.

The piezoelectric mechanism 310 includes the piezoelectric element 312, a liquid supply port 306, the liquid chamber 311, a valve holding member 307. The valve holding member 307 has a space 307*a* with a hollow cross section, and is provided with the liquid supply port 306 near the nozzle 302. The liquid supply port 306 supplies a liquid supplied from the outside into the liquid chamber 311. The piezoelectric element 312 is disposed in the space 307*a* provided in the valve holding member 307, and is held by the valve holding member 307 so as to perform a vibrating operation.

In the above configuration, with no application of a drive voltage to the piezoelectric element 312, the liquid in the liquid chamber 311 is not discharged from the nozzle 302 as in FIG. 3A. Application a drive voltage to the piezoelectric element 312 causes the piezoelectric element 312 to vibrate, so that as in FIG. 3B, the liquid in the liquid chamber 311 is discharged as a droplet D from the nozzle 302.

After completion of the liquid discharge from the nozzle 302 in such a manner, a thickened liquid La may remain on the nozzle 302 and the nozzle face 301 as illustrated in FIG. 4A or 4B. Further, a mist generated at the time of liquid discharge from the nozzle 302 may adhere to the periphery of the nozzle 302 of the nozzle face 301 and remain as an adhered substance Lb as illustrated in FIG. 4C.

The thickened liquid La and the adhered substance Lb become resistance in discharge of the liquid from the nozzle 302, which causes discharge deflection of the liquid (the liquid may not be correctly discharged to a target position). A large viscosity of the liquid La may cause a discharge failure (failure in liquid discharge from the nozzle 302). In order to maintain the discharge quality, it is desired to remove the thickened liquid La and the adhered substance Lb.

Therefore, conventionally, for example, as illustrated in FIG. 5A, a cleaning nozzle 201 and an air nozzle 211 are each provided at a position as to face the nozzle face 301. A cleaning liquid from the cleaning nozzle 201 and cleaning air from the air nozzle 211 have been blown onto the nozzle face 301 to clean the nozzle face 301 and the nozzle 302. FIG. 5B is a partially enlarged view taken along line A-A in FIG. 5A. In order to remove foreign matter such as the thickened liquid La and the adhered substance Lb adhering to the nozzle face 301, high pressure is applied to the cleaning liquid and the cleaning air. As a result, the cleaning liquid may enter the liquid chamber 311 as indicated by the broken line in FIG. 5B. The entry of the cleaning liquid into the liquid chamber 311 causes dilution of the liquid in the liquid chamber 311, which affects the quality of the target object 5000. Therefore, conventionally, the liquid diluted with the cleaning liquid has been discharged from the liquid chamber 311 and discarded before start of the next liquid discharge operation.

[Configuration of Valve Head]

Figure 6:
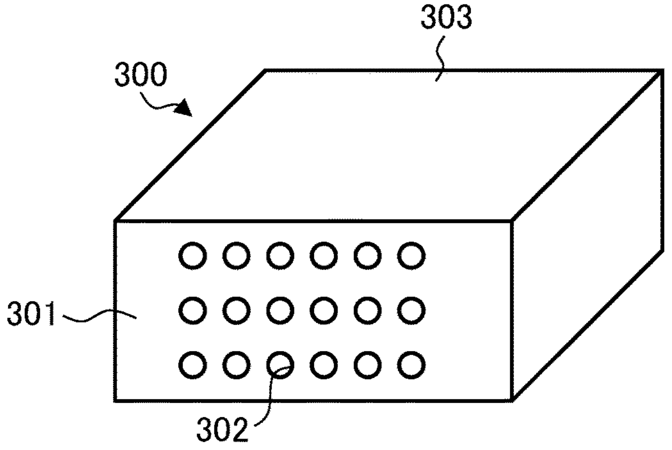
FIG. 6 is a schematic perspective view illustrating the entirety of an exemplary valve head.

Hereinafter, the configuration of a valve head used in the present embodiment will be described with reference to FIGS. 6 to 8B. First, a schematic configuration of the valve head will be described with reference to FIG. 6. FIG. 6 is a schematic perspective view illustrating the entirety of an exemplary valve head.

FIG. 6 illustrates a head 300 as a valve head employing an inkjet system. The head 300 mainly includes a nozzle face 301, a nozzle 302, and a housing 303. The nozzle face 301 is provided on one face of the housing 303 and is provided with the nozzle 302 for discharging a liquid. The nozzle 302 is a minute opening that can be opened or closed by a valve mechanism to be described later. With the valve mechanism keeping the nozzle 302 opened, the liquid is discharged from the nozzle 302. The housing 303 incorporates, for example, the valve mechanism that opens or closes the nozzle 302.

The nozzle face 301 provided with the nozzle 302 may be a separate member such as a nozzle plate 340 such that the nozzle plate 340 is held by the housing 303. The number and arrangement of nozzles 302 are not limited to the illustrated configuration. The number of nozzles 302 may be more than 18, or may be one instead of at least two. The arrangement of nozzles 302 may be one row instead of at least two rows.

Figure 7A:
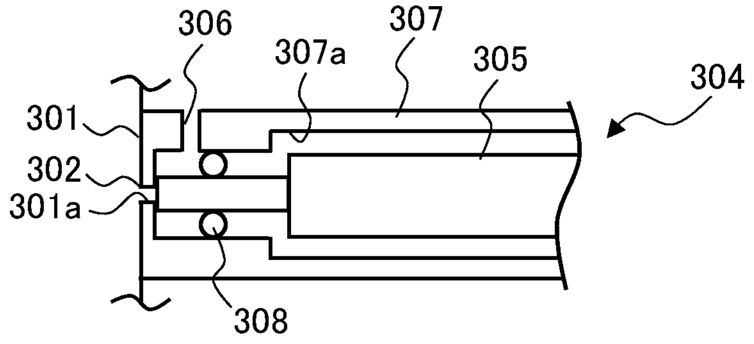
FIGS. 7A to 7C are schematic explanatory views illustrating the discharge principle of the valve head.
Figure 7B:
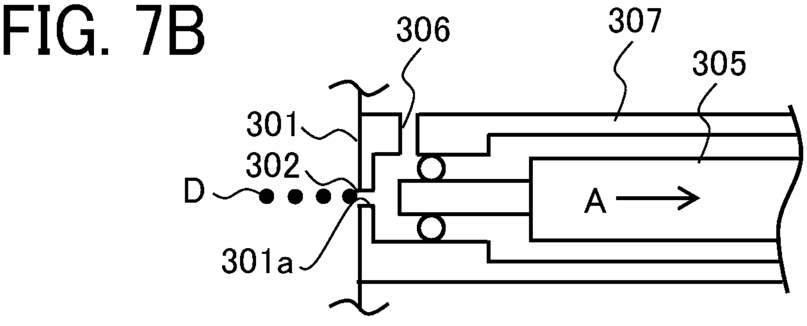
Figure 7C:
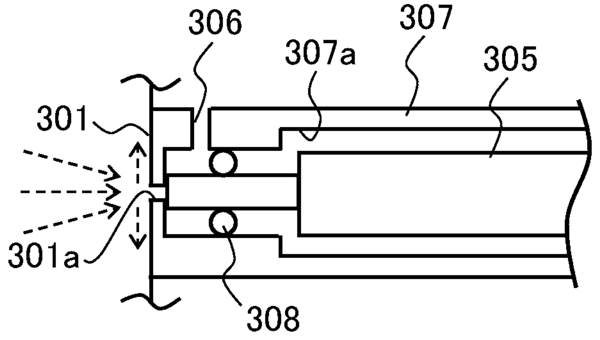

FIGS. 7A to 7C are schematic explanatory views illustrating the discharge principle of the valve head. FIG. 7A illustrates that the nozzle is kept closed. FIG. 7B illustrates the nozzle is kept opened. FIG. 7C illustrates cleaning of the nozzle face.

The housing 303 of the head 300 in FIG. 6 incorporates such a valve mechanism 304 as illustrated in FIGS. 7A to 7C. The valve mechanism 304 is provided such that a single valve mechanism 304 is provided for a single nozzle 302.

The valve mechanism 304 includes a valve 305, a liquid supply port 306, a valve holding member 307. The valve holding member 307 has a space 307*a* with a hollow cross section, and is provided with a liquid supply port 306 near the nozzle 302. The liquid supply port 306 receives a liquid supplied in an externally pressurized state into the valve holding member 307, and supplies the liquid to the rear portion of the nozzle face 301. The valve 305 is disposed in the space 307*a* provided in the valve holding member 307, and is held by the valve holding member 307 so as to be movable in the axial direction through a bearing 308. Here, the valve 305 is an exemplary "valve member".

In the above configuration, with the leading end of the valve 305 in close contact with the nozzle 302 as illustrated in FIG. 7A, the nozzle 302 (communication port 301*a*) is kept closed. Thus a liquid supplied from the liquid supply port 306 is not discharged from the nozzle 302. When a voltage is applied to the valve 305, the valve 305 moves in the direction of the arrow A as illustrated in FIG. 7B, so that the nozzle 302 is kept opened. As a result, the liquid supply port 306 and the nozzle 302 communicate with each other through the communication port 301*a*, and the liquid is discharged as a droplet D from the nozzle 302. The valve 305 opens or closes the nozzle 302 at a high speed with a frequency of several kHz, and can discharge the liquid on a drop basis.

In cleaning of the nozzle face 301, the leading end of the valve 305 comes into close contact with the nozzle 302 to close the nozzle 302 as illustrated in FIG. 7C. With the nozzle kept closed, the cleaning liquid is blown from the cleaning nozzle 201 (to be described later) to the nozzle face 301 as indicated by a broken line. Thus the nozzle face 301 and the nozzle 302 can be cleaned while preventing entry of the cleaning liquid into the valve holding member 307.

Figure 8B:
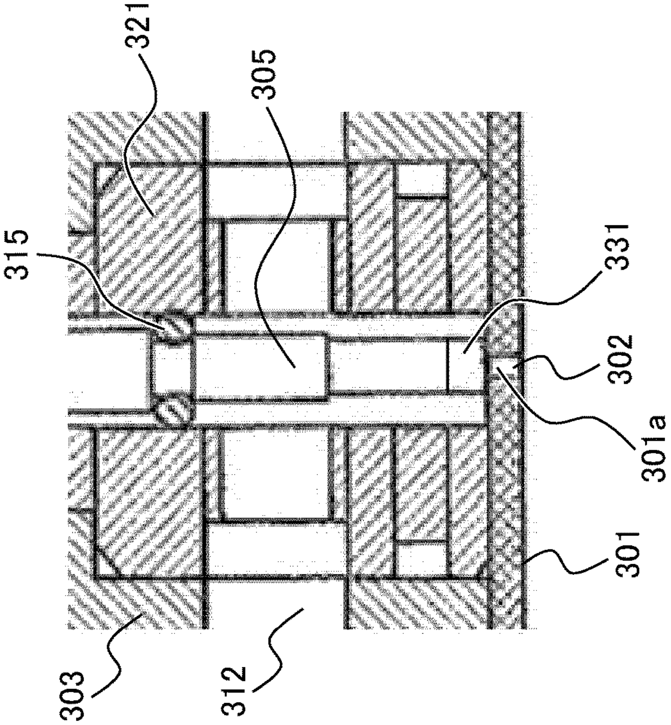
FIGS. 8A and 8B are explanatory views of a single valve mechanism included in a head.
Figure 8A:
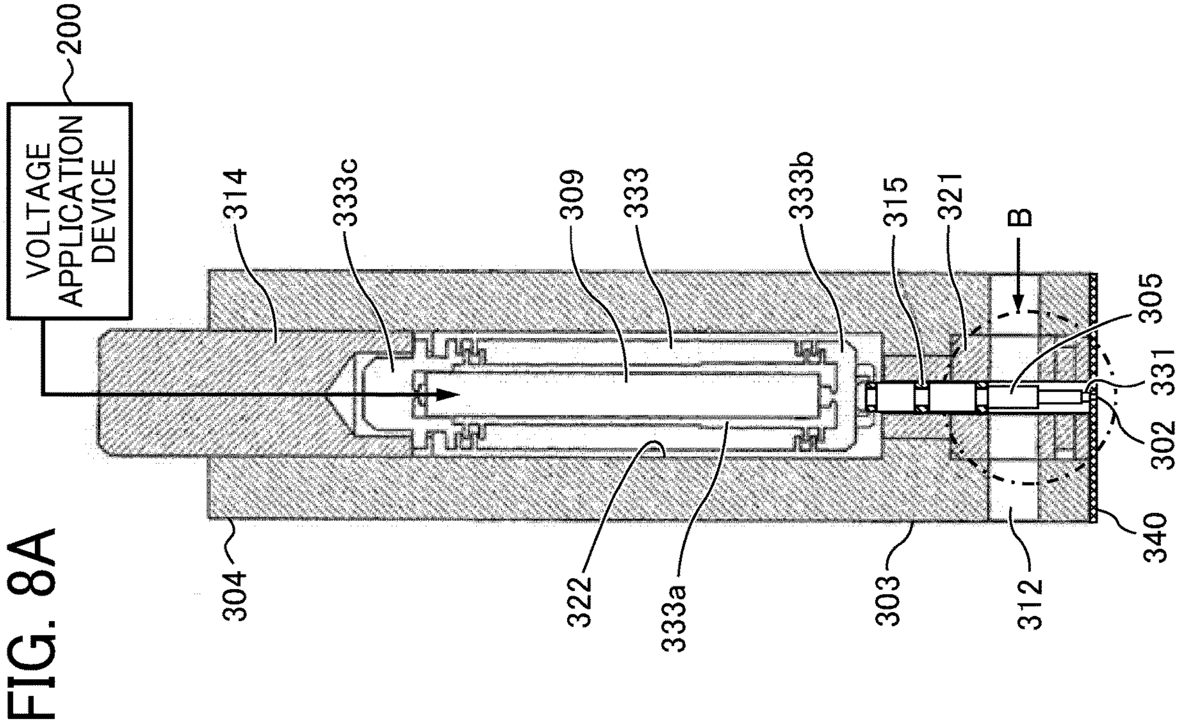

The configuration of the valve mechanism 304 will be supplemented with reference to FIGS. 8A and 8B. FIGS. 8A and 8B are explanatory views of a single valve mechanism included in the head 300. FIG. 8A is a cross-sectional view of the entirety of the valve mechanism.

FIG. 8B is an enlarged view of a portion B in FIG. 8A.

The valve mechanism 304 includes the valve 305 that opens or closes the nozzle 302 and a piezoelectric element 332 that drives the valve 305. A nozzle plate 340 is joined to the housing 303. A liquid chamber 311 forms a channel common to a plurality of the valve mechanisms 304 that the housing 303 is provided with.

The valve 305 has a leading end provided with an elastic member 331 such that the leading end of the valve 305 reliably closes the nozzle 302 when the leading of the valve 305 is pressed against the nozzle plate 340. A bearing portion 321 is provided between the valve 305 and the housing 303. A seal member 315 such as an O-ring is provided between the bearing portion 321 and the valve 305.

A piezoelectric element 309 is accommodated in a space 322 of the housing 303. A holding member 333 has a central space 333*a* and a leading end portion 333*b*. The central space 333*a* holds the piezoelectric element 309. The piezoelectric element 309 and the valve 305 are coaxially coupled through the leading end portion 333*b* of the holding member 333. That is, the holding member 333 has the central space 333*a* accommodating the piezoelectric element 309, the leading end portion 333*b* is coupled to the valve 305, and a rear end portion 333*c* that the holding member 333 has is secured by a regulating member 314 attached to the housing 303.

In response to application of a voltage by a voltage application device 200, the piezoelectric element 309 drives the valve 305 in a direction in which the nozzle 302 opens. With no voltage applied to the piezoelectric element 309, the valve 305 keeps the nozzle 302 closed. Thus, even if ink is pressurized and supplied to the liquid chamber 311, the ink is not discharged from the nozzle 302. Application of a voltage to the piezoelectric element 309 causes the piezoelectric element 309 to contract and pull the valve 305 through the holding member 333, whereby the valve 305 is separated from the nozzle 302 to open the nozzle 302. As a result, the nozzle 302 and the liquid chamber 311 communicate with each other through the communication port 301*a*, and the ink pressurized and supplied to the liquid chamber 311 is discharged from the nozzle 302.

As described above, the present embodiment includes the head 300 including: the nozzle 302 that discharges liquid; the liquid chamber 311 in communication with the nozzle 302 through the communication port 301*a*; the nozzle face 301 provided with the nozzle 302; and the valve 305 that opens or closes the communication port 301*a*; and a cleaner (e.g., the cleaning nozzle 201 and the tube 202) including the cleaning nozzle 201 that supplies a cleaning liquid to the nozzle face 301, in which the cleaning liquid is supplied to the nozzle face 301 with the valve 305 keeping the nozzle 302 (the communication port 301*a*) closed. This arrangement allows cleaning of the nozzle face 301 and the nozzle 302 while preventing entry of the cleaning liquid into the head 300.

[Configuration of Cleaning Station]

Figure 9:
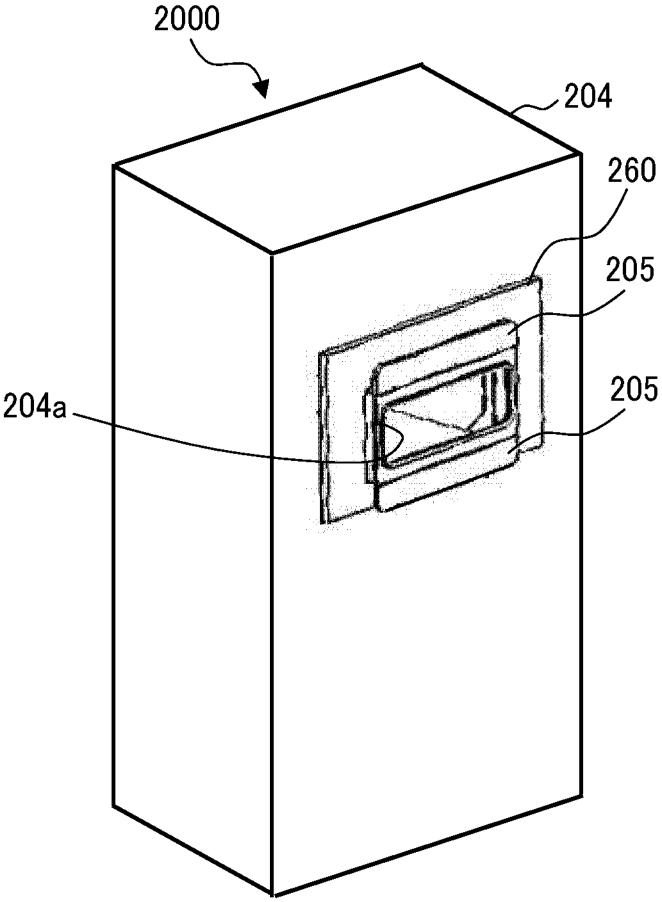
FIG. 9 is an explanatory view illustrating an exemplary external appearance of a cleaning station.
Figure 10C:
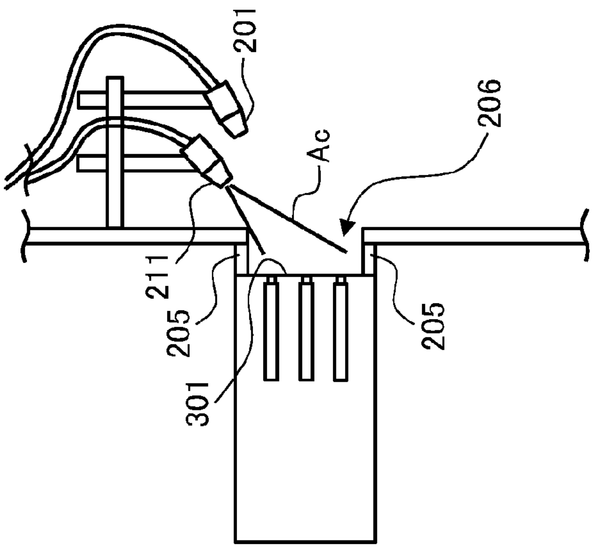
FIGS. 10A to 10C are explanatory views illustrating an exemplary internal configuration of the cleaning station.
Figure 10B:
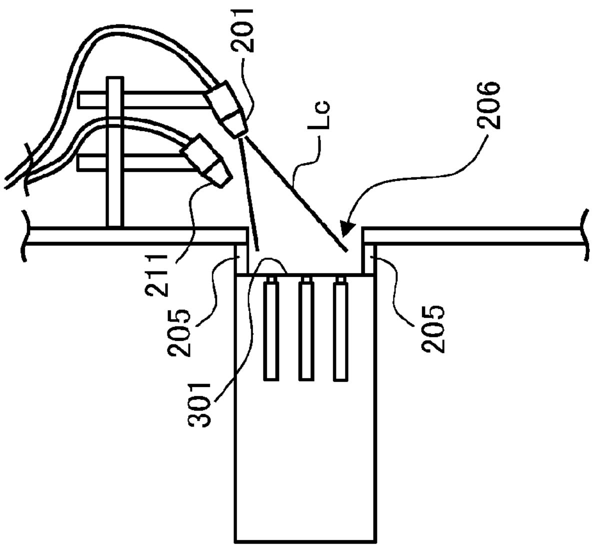
Figure 10A:
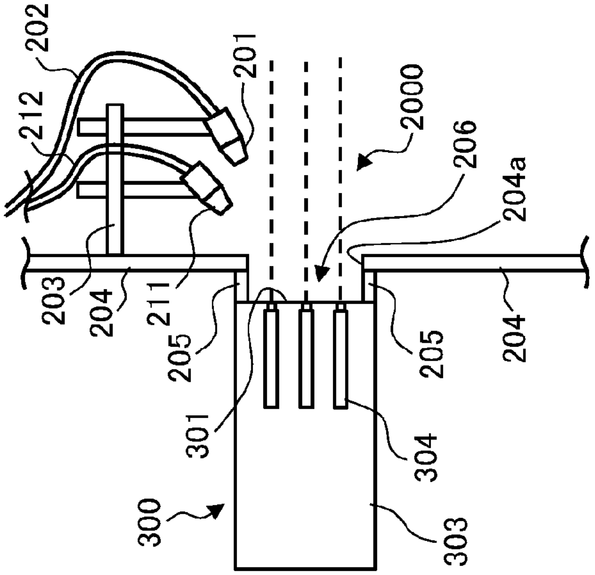
Figure 11:
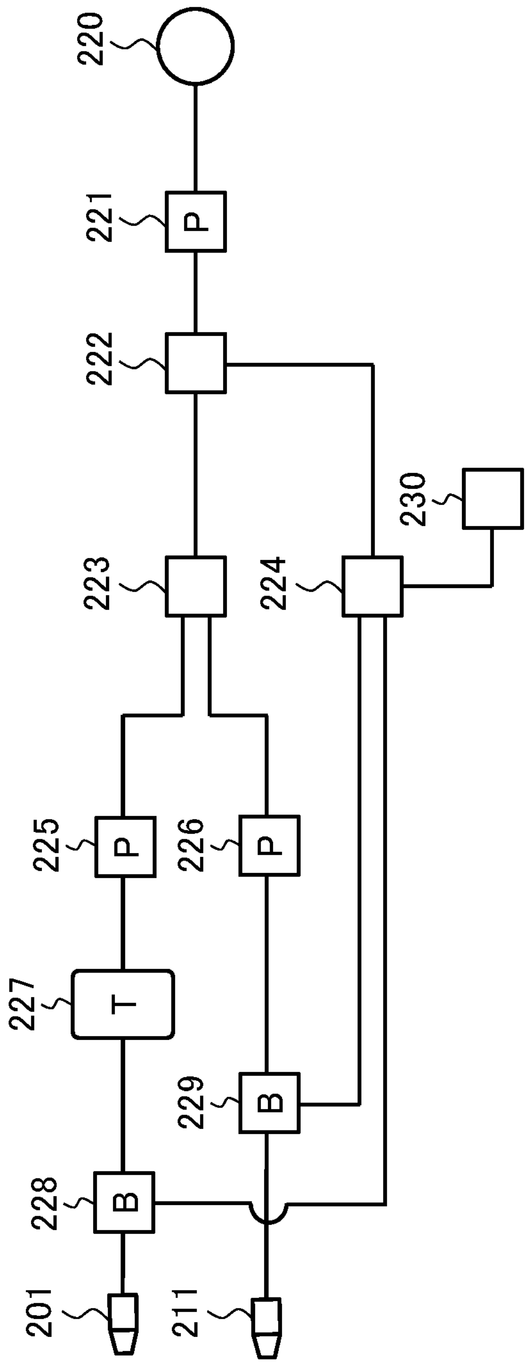
FIG. 11 is an explanatory view schematically illustrating routing for a cleaning liquid and air.

The configuration of the cleaning station will be described with reference to FIGS. 9 to 11.

[External Configuration]

First, the external configuration of the cleaning station 2000 will be described with reference to FIG. 9. FIG. 9 is an explanatory view illustrating an exemplary external appearance of the cleaning station.

The cleaning station 2000 is provided in the coating booth 1 as described above. In response to movement of the head unit 100 to the cleaning station 2000 by the coating robot 1000, the cleaning station 2000 performs cleaning (cleaning) processing on the head 300. The cleaning station 2000 includes a main body housing 204, the sealing member 205, and a base plate 260.

The main body housing 204 has a side face. Part of the side face is provided with an opening 204*a* smaller in area than the nozzle face 301 of the head 300. The opening 204*a* has a periphery (edge portion) provided with the sealing member 205 through the base plate 260. In response to performing of the cleaning processing on the head 300, the nozzle face 301 is pressed against the sealing member 205, so that the sealing member 205 forms a sealed space (hereinafter, a sealed portion to be described later) between the head 300 and the cleaning station 2000.

The cleaning station 2000 is typically provided integrally with a system (or an apparatus) with the head 300 mounted. However, in the present embodiment, the coating robot 1000 and the cleaning station 2000 are independent (separated) in structure. The cleaning station 2000 having this arrangement can prevent spilling of the cleaning liquid from the coating robot 1000 in transportation. Further, the cleaning station 2000 having this arrangement can reduce the portable weight of the coating robot 1000.

As described above, in the present embodiment, the head 300 and the cleaning station 2000 (specifically, for example, the cleaning nozzle 201, the air nozzle 211, the tube 202, and a tube 212 to be described later) are provided independently in the coating booth 1. The cleaning station 2000 having this arrangement can prevent spilling of the cleaning liquid in, for example, installation of the coating robot 1000 and can reduce the portable weight of the coating robot 1000. Further, the separation from the head 300 results in an increase of the degree of freedom of the head orientation in cleaning. Furthermore, the cleaning performance of waste-liquid processing in the cleaning station 2000 is improved.

[Internal Configuration]

Next, the internal configuration of the cleaning station 2000 will be described with reference to FIGS. 10A to 10C. FIGS. 10A to 10C are explanatory views illustrating an exemplary internal configuration of the cleaning station. FIG. 10A is an explanatory view illustrating a positional relationship of each member with a sealed portion formed. FIG. 10B is an explanatory view illustrating the nozzle face to which cleaning liquid is discharge. FIG. 10C is an explanatory view illustrating the nozzle to face which a cleaning air is blown. In FIGS. 10A to 10C, the base plate 260 in FIG. 9 is omitted for simplification.

In FIG. 10A, inside the cleaning station 2000, included are the cleaning nozzle 201, the tube 202 connected to the cleaning nozzle 201, the air nozzle 211, the tube 212 connected to the air nozzle 211, a nozzle holder 203 having one end holding the cleaning nozzle 201 and the air nozzle 211, and the main body housing 204 holding the other end that the nozzle holder 203 has. Here, the cleaning nozzle 201, the air nozzle 211, and the tubes 202 and 212 serve as an exemplary “cleaning apparatus”. Among the cleaning nozzle 201, the air nozzle 211, and the tubes 202 and 212, the cleaning nozzle 201 and the tube 202 serve as an exemplary “first cleaning-liquid remover”, and the air nozzle 211 and the tube 212 serve as an exemplary “second cleaning-liquid remover”.

The main body housing 204 has the part of the side face provided with the opening 204*a*. The opening 204*a* has a periphery provided with the sealing member 205. In response to performing of cleaning processing on the head 300, the nozzle face 301 of the head 300 is pressed against the sealing member 205 so that the sealing member 205 forms a sealed portion 206 between the head 300 and the cleaning station 2000. The nozzle 302 of the head 300 at this time is “kept closed” in, for example, FIG. 7A.

The nozzle face 301 is secured in a direction intersecting the horizontal plane (vertical direction in the present embodiment). With the nozzle face 301 secured downward in the direction of gravity, a cleaning liquid is blown up to the nozzle face 301. Thus the cleaning liquid is discharge against the gravity, resulting in a decrease in the cleaning efficiency. Alternatively, with the nozzle face 301 inclined and secured at an angle larger than 90 degrees with respect to the horizontal plane, the scattering range of the cleaning liquid bounced back on the nozzle face 301 becomes large. Thus the entirety of the apparatus becomes large due to an increase in size of the scattering prevention member. Further, the cleaning liquid is likely to remain at the respective corner portions of the sealing member 205 and the nozzle face 301, which may lead to difficulty in complete removal of the cleaning liquid after cleaning. On the basis of the above points, the angle of the nozzle face 301 with respect to the horizontal plane may be appropriately set within a range in which the cleaning liquid is not blown up.

The cleaning nozzle 201 and the air nozzle 211 are each disposed at a position out of the normal line (on the broken line in FIG. 10A extending from the center of the nozzle which the nozzle face 301 of the head 300 is provided (at a position above the normal line in the direction of gravity in the present embodiment). The liquid discharged to the target object 5000 is not limited to a single color, and thus the type such as color or characteristics is changed in some cases. In such a case, the liquid remaining in the nozzle of the head 300 is discharged once to replace the liquid. In the present embodiment, such liquid replacement (changing) processing is also performed in the cleaning station 2000, which allows reduction in size and cost of the equipment without a new apparatus.

If the cleaning nozzle 201 and the air nozzle 211 are present on the normal line in the liquid replacement processing, the liquid discharged in the liquid replacement processing hits the cleaning nozzle 201 and the air nozzle 211 to contaminate the cleaning nozzle 201 and the air nozzle 211. Therefore, in the present embodiment, the cleaning nozzle 201 and the air nozzle 211 are disposed at the positions above the normal line extending from the center of the nozzle, resulting in prevention of contamination of the cleaning nozzle 201 and the air nozzle 211.

As described above, in the present embodiment, the cleaning nozzle 201 is disposed at the position out of the normal line extending from the center of the nozzle 302 in cleaning.

Further, as described above, the nozzle face 301 is disposed intersecting the horizontal plane, and the cleaning nozzle 201 is disposed above the perpendicular line of the nozzle face 301 in the direction of gravity.

With this arrangement, the liquid discharged in, for example, liquid replacement (change) processing does not hit the cleaning nozzle 201, resulting in prevention of contamination of the cleaning nozzle 201.

Furthermore, as described above, for a change of liquid in type, the cleaner cleans the nozzle face 301 after the liquid remaining in the nozzle 302 is discharged before the change. Thus the liquid replacement (change) processing can be performed with a small number of times of cleaning.

Still furthermore, as described above, provided with the sealing member 205 allowing formation of the sealed portion 206 to the nozzle face 301. This arrangement allows prevention of scattering of the cleaning liquid around the cleaning station 2000.

Due to formation of the sealed portion 206 after the head 300 is moved to the cleaning station 2000 by the coating robot 1000, the cleaning liquid Lc is discharge from the cleaning nozzle 201 to the nozzle face 301 as illustrated in FIG. 10B. The discharge of the cleaning liquid Lc from the cleaning nozzle 201 is complete in response to the elapse of a predetermined time.

The shape of the cleaning nozzle 201 is not particularly limited. However, in the present embodiment, the cleaning liquid Lc from the cleaning nozzle 201 is discharge with a predetermined discharge width. For example, selection of a charging conical nozzle as the cleaning nozzle 201 allows cleaning in a wide range with a single nozzle. Selection of a linear nozzle as the cleaning nozzle 201 allows the cleaning liquid Lc to hit the nozzle face 301 at pinpoint. Thus the detergency can be further enhanced. Further, selection of a fan-shaped nozzle as the cleaning nozzle 201 allows achievement in both a wide range of cleaning and detergency.

With the cleaning liquid Lc adhering to the nozzle face 301, the cleaning liquid Lc falls onto the target object 5000 in discharge of the liquid to the target object 5000, which leads to deterioration in the quality of the target object 5000. In order to prevent the cleaning liquid Lc from falling onto the target object 5000 during the liquid discharging operation, as illustrated in FIG. 10C, after discharge of the cleaning liquid Lc, the cleaning air Ac is discharge from the air nozzle 211 to remove the cleaning liquid Lc adhering to the nozzle face 301. The discharge of the cleaning air Ac from the air nozzle 211 is complete in response to the elapse of a predetermined time.

[Cleaning Liquid and Air Supply System]

Next, a cleaning liquid and air supply system in the cleaning station 2000 will be described with reference to FIG. 11. FIG. 11 is an explanatory view schematically illustrating routing for a cleaning liquid and air.

Facility air 220 as an air source for facilities supplies pressurized air to a primary regulator 221. The primary regulator 221 adjusts the pressure of air, and supplies the adjusted air to a primary joint 222. The primary joint 222 branches the air from the primary regulator 221 into two systems. The primary joint 222 supplies one to a secondary joint 223 and supplies the other to a solenoid valve 224.

The secondary joint 223 further branches the air from the primary joint 222 into two systems. The secondary joint 223 supplies one to a liquid-pressure adjustment regulator 225 and supplies the other to an air-pressure adjustment regulator 226. The liquid-pressure adjustment regulator 225 adjusts the pressure of a pressurizing tank 227 provided at the subsequent stage, and pressurizes the cleaning liquid stored in the pressurizing tank 227 with a predetermined pressure to supply the cleaning liquid to the cleaning nozzle 201.

The air supplied from the primary joint 222 to the solenoid valve 224 is supplied to a cleaning-liquid ON/OFF valve 228 provided at the subsequent stage of the pressurizing tank 227 and an air ON/OFF valve 229 provided at the subsequent stage of the air-pressure adjustment regulator 226. The supplied air is used for each ON/OFF control of the cleaning-liquid ON/OFF valve 228 and the air ON/OFF valve 229. The solenoid valve 224 is connected to a control terminal 230 such as a personal computer (PC).

In the above configuration, when the control terminal 230 determines that a space between the nozzle face 301 and the cleaning station 2000 is sealed by the sealing member 205 due to the movement of the head 300 to the cleaning station 2000, the control terminal 230 turns on air input (supply) from the solenoid valve 224 to the cleaning-liquid ON/OFF valve 228. As a result, the cleaning liquid Lc is discharge from the cleaning nozzle 201 to the nozzle face 301. In response to the elapse of a predetermined time, the control terminal 230 turns off the air input (supply) from the solenoid valve 224 to the cleaning-liquid ON/OFF valve 228, and the discharge of the cleaning liquid Lc is complete.

The control terminal 230 teaches in advance the coating robot 1000 the coordinates indicating the position where a sealed portion 206 is to be formed. On the basis of the coordinate information, the control terminal 230 determines whether the robot arm of the coating robot 1000 has reached the coordinates. A method of detecting the position of the robot arm by a position sensor without the coordinate information can be also conceived.

However, when the ink, paint, or cleaning liquid is a liquid containing a solvent and the coating booth 1 is defined as an explosion-proof area, use of an electric device may conflict with the explosion-proof standard. Thus use of the position sensor is difficult in some cases. The present embodiment is not limited to the configuration in which such a determination is made on the basis of the coordinate information. For example, when the coating booth 1 is not defined as an explosion-proof area, the control terminal 230 may determine the formation of the sealed portion 206 on the basis of a detection result by, for example, the position sensor.

In response to the completion of the discharge of the cleaning liquid Lc to the nozzle face 301, the control terminal 230 turns on air input (supply) from the solenoid valve 224 to the air ON/OFF valve 229. As a result, the cleaning air Ac is discharge from the air nozzle 211 to the nozzle face 301. In response to the elapse of a predetermined time, the control terminal 230 turns off the air input (supply) from the solenoid valve 224 to the air ON/OFF valve 229, and the discharge of the cleaning air Ac is complete.

[Description of Cleaning Operation]

Next, the cleaning operation of the present embodiment will be described with reference to FIGS. 12A to 14. FIGS. 12A to 12E are explanatory views illustrating exemplary cleaning processes.

Figure 12A:
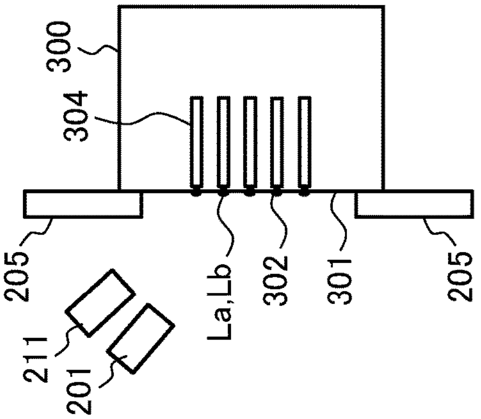
FIGS. 12A to 12E are explanatory views illustrating exemplary cleaning processes.

The nozzle face 301 of the head 300 is cleaned in this order of FIGS. 12A to 12E. In response to completion of liquid discharge to the target object 5000, the coating robot 1000 moves the head 300 to the cleaning station 2000. The coating robot 1000 presses the nozzle face 301 of the head 300 against the sealing member 205 of the cleaning station 2000. Then, as illustrated in FIG. 12A, the coating robot 1000 secures (holds) the head 300 at the position where the sealed portion 206 is formed. The nozzle 302 of the head 300 at this time is "kept closed" in, for example, FIG. 7A.

Figure 12B:
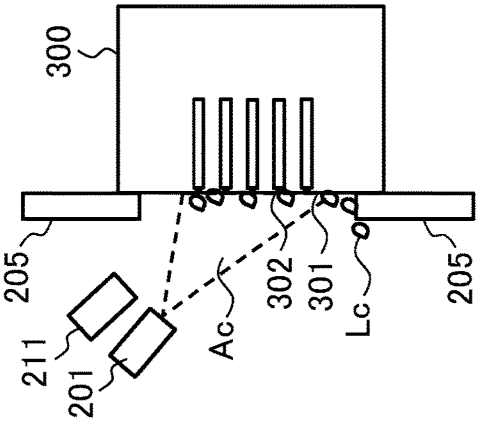

Next, as illustrated in FIG. 12B, the cleaning liquid Lc is discharge from the cleaning nozzle 201 to the nozzle face 301 to wash away the thickened liquid La, the adhered substance Lb, and others adhering to the nozzle face 301 and the nozzle 302. Subsequently, as illustrated in FIG. 12C, the cleaning air Ac is discharge from the air nozzle 211 to the nozzle face 301 to blow off the cleaning liquid Lc and the others remaining on the nozzle face 301 and the nozzle 302.

Figure 12C:
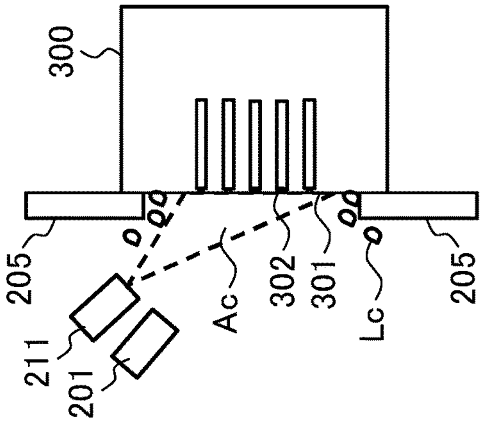
Figure 13:
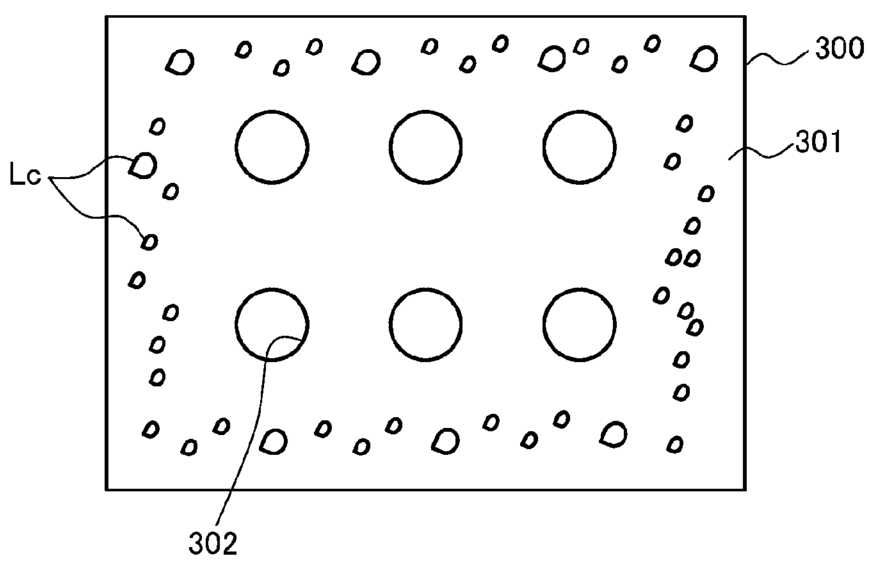
FIG. 13 is an explanatory view illustrating a nozzle face after cleaning.

However, the contamination on the nozzle face 301 may not be removed by performing the steps of FIGS. 12A to 12C in some cases. For example, as illustrated in FIG. 13, the cleaning liquid Lc and others having not been removed by the cleaning air Ac may remain on the edge between the nozzle face 301 and the sealing member 205 in some cases.

Figure 12D:
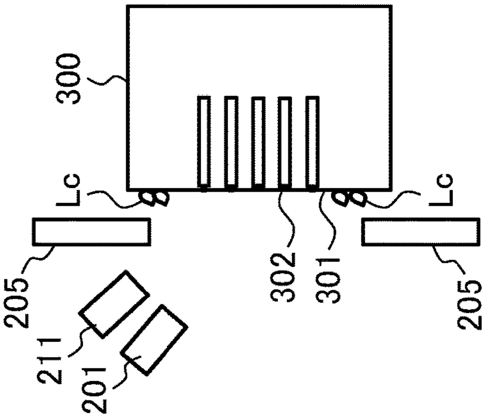

Therefore, in response to the completion of the discharge of the cleaning air Ac with the sealed portion 206 formed, the coating robot 1000 moves the head 300 in a direction of releasing the pressing of the nozzle face 301 and the sealing member 205. Then, as illustrated in FIG. 12D, the nozzle face 301 is separated from the sealing member 205 by a predetermined distance. Subsequently, as illustrated in FIG. 12E, the cleaning air Ac is discharge again from the air nozzle 211 to the nozzle face 301 to blow off the cleaning liquid Lc and the others remaining on the nozzle face 301.

As a result, the cleaning liquid Lc and the others remaining at the edge portion between the nozzle face 301 and the sealing member 205 can also be removed. Due to re-discharge with the air nozzle 211 and use of such an existing component, there is no replacement of consumables, which leads to achievement in cost reduction and compactness of the apparatus.

Figure 12E:
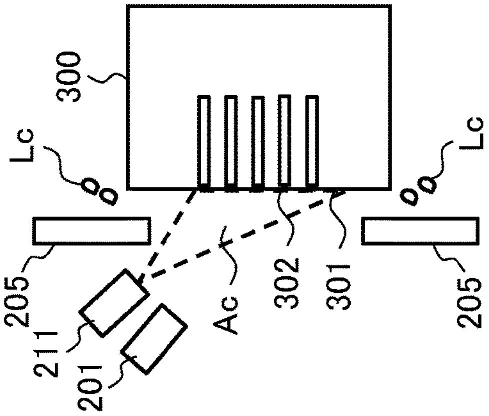
Figure 14:
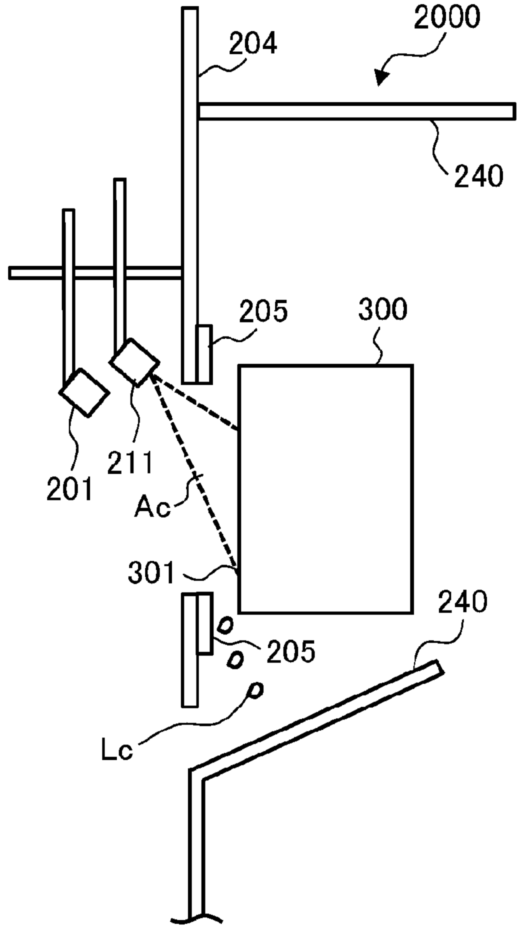
FIG. 14 is an explanatory view illustrating an exemplary residual cleaning-liquid removal configuration.

The re-discharge of the cleaning air Ac in FIG. 12E is performed with no sealed portion 206 formed, so that the cleaning liquid Lc and the others blown off by the cleaning air Ac are scattered around. Therefore, for example, as illustrated in FIG. 14, desirably, the main body housing 204 of the cleaning station 2000 is provided with a member 240.

As described above, the present embodiment includes the cleaning nozzle 201 that discharges the cleaning liquid Lc onto the nozzle face 301 with the sealed portion 206 formed between the sealing member 205 and the nozzle face 301, and the air nozzle 211 that removes the cleaning liquid Lc supplied to the nozzle face 301 with no sealed portion 206 formed between the sealing member 205 and the nozzle face 301.

Further, as described above, the air nozzle 211 blows the cleaning air Ac to the nozzle face 301.

Figure 15:
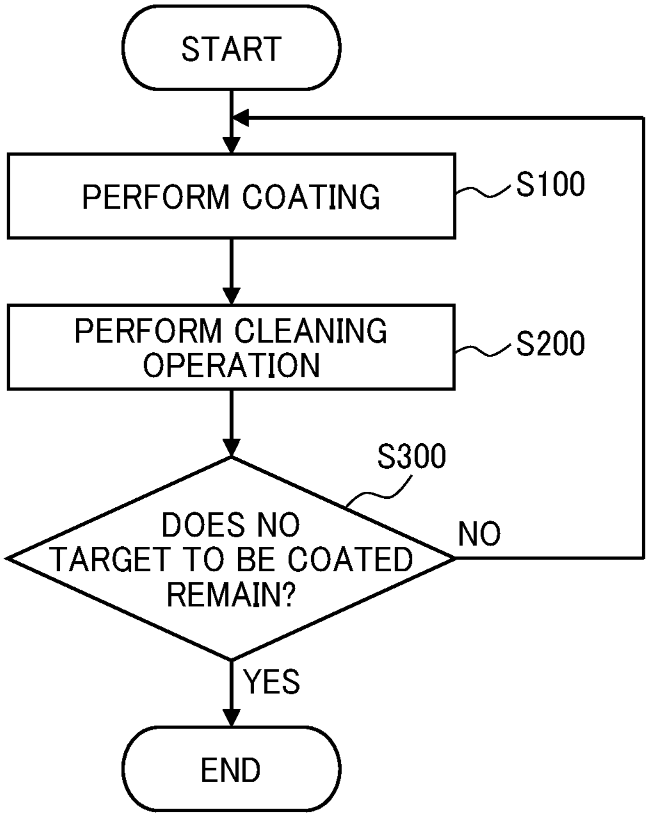
FIG. 15 is a flowchart illustrating a series of operations from coating to cleaning in the present embodiment.

As a result, the cleaning air Ac spreads to each corner of the nozzle face 301, and the cleaning liquid Lc and the others remaining at the edge portion between the nozzle face 301 and the sealing member 205 can be removed. The above cleaning operation is performed after completion of coating of a single vehicle body or after completion of a daily vehicle-body coating schedule. The timing at which the cleaning operation is performed is not particularly limited, and thus for example, the cleaning operation may be performed before the start of coating. FIG. 15 is a flowchart illustrating a series of operations from coating to cleaning in the present embodiment. As illustrated in FIG. 15, in the coating system 3000, coating on the target object 5000 is performed (step S100). If the coating is complete, a cleaning operation is performed in the coating system 3000 (step S200). Next, if the cleaning operation is complete, the coating system 3000 determines whether the target object 5000 to be coated remains (step S300). If the coating system 3000 determines that no target object 5000 remains, a series of coating operations is complete. If the coating system 3000 determines in step S300 that the target object 5000 remains, the flow returns to step S100 to start coating on the target object 5000.

Figure 16:
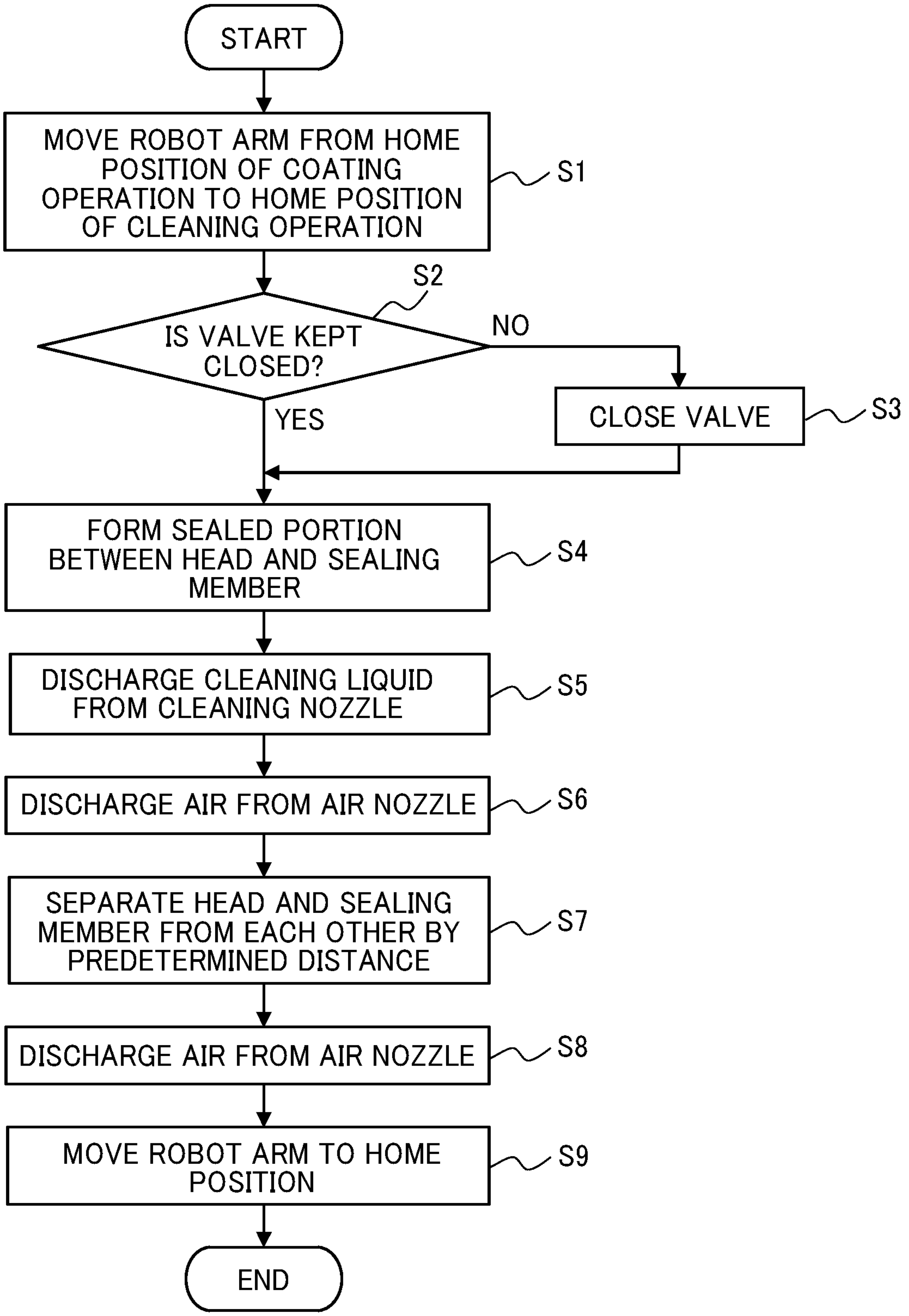
FIG. 16 is a flowchart illustrating an exemplary cleaning operation.

Here, an exemplary flow of the cleaning operation in the present embodiment will be described with reference to FIGS. 16 to 18. FIG. 16 is a flowchart illustrating an exemplary cleaning operation.

In response to start of the cleaning operation on the head 300, the robot arm moves from the home position of the coating operation to the home position of the cleaning operation (step S1). If the robot arm reaches the home position of the cleaning operation, the robot controller 70 determines whether the valve 305 of the head 300 is kept closed (the nozzle 302 is kept closed) (step S2). If the robot controller 70 determines in step S2 that the valve 305 is not closed (No), the valve 305 is closed and the nozzle 302 is closed (step S3).

If the valve 305 is kept closed, the head 300 and the sealing member 205 are brought into contact with each other, and a sealed portion 206 is formed between the head 300 and the cleaning station 2000 (step S4). If the sealed portion 206 is formed, the cleaning nozzle 201 provided in the sealed portion 206 discharges (discharges) a cleaning liquid to clean the nozzle face 301 (step S5).

Next, the air nozzle 211 provided in the sealed portion 206 discharges air to the nozzle face 301 with the cleaning liquid adhering thereto (step S6). Thereafter, the head 300 and the sealing member 205 are separated from each other by a predetermined distance, so that the sealed portion 206 is released (step S7).

After the release of the sealed portion 206 in step S7, the air nozzle 211 re-discharges air to the nozzle face 301 (step S8). Due to the second air discharge, foreign matter such as dirt pushed to the contact portion between the nozzle face 301 and the sealing member 205 in the first air discharge can be blown off outward the nozzle face 301. If the second air discharge is complete, the robot arm moves to the home position, and the cleaning operation is complete (step S9).

Figure 17:
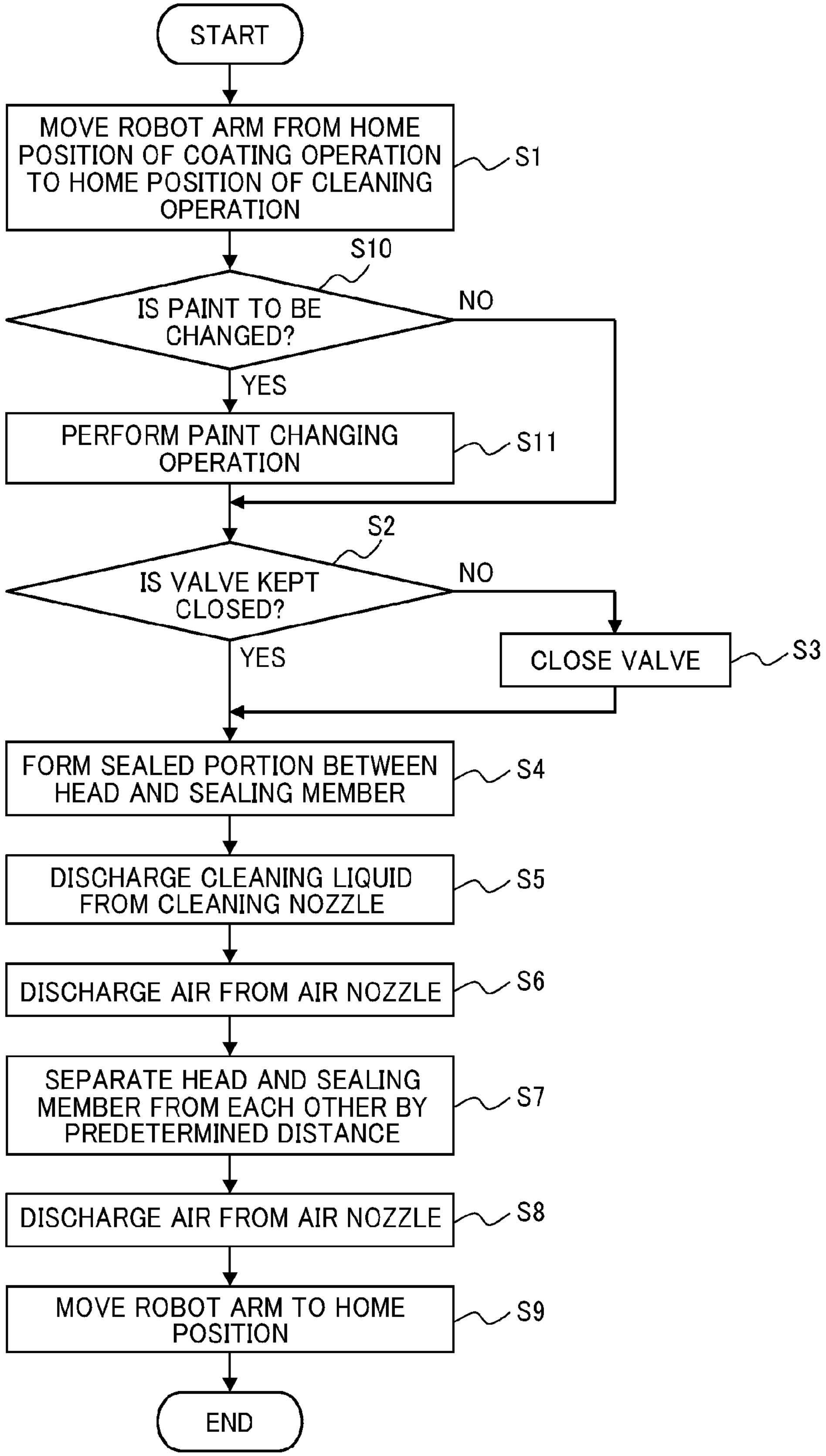
FIG. 17 is a flowchart illustrating another exemplary cleaning operation.

FIG. 17 is a flowchart illustrating another exemplary cleaning operation. The flowchart in FIG. 17 is different from the flowchart in FIG. 16 in that a paint changing operation is added between step S1 and step S2. Thus the same processes or operations as the processes or operations in the flow in FIG. 16 are denoted with the same reference signs, and description thereof is not given.

In the flow in FIG. 17, after step S1, the robot controller 70 determines whether to change the paint to be used for coating (step S10). If the robot controller 70 determines in step S10 that the paint is not to be changed (No), the process proceeds to step S2. Thereafter, processes or operations similar to the processes or operations in the flow of FIG. 16 are performed. If the robot controller 70 determines in step S10 that the paint is to be changed (Yes), the paint changing operation is performed (step S11).

Figure 18:
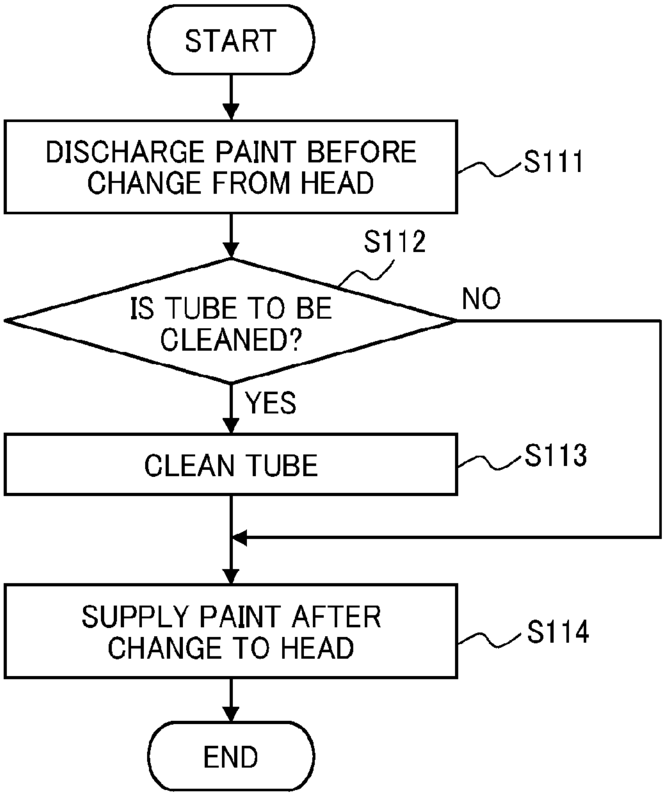
FIG. 18 is a flowchart illustrating an exemplary paint changing operation.

The paint changing operation is performed on the basis of, for example, the flow in FIG. 18. First, the robot controller 70 causes the head 300 to discharge the paint before the change (step S111). Next, the robot controller 70 determines whether to clean the tube that supplies the paint to the head 300 (step S112). If the robot controller 70 determines in step S112 that the tube is not to be cleaned (No), the paint after the change is supplied to the head 300, and the paint changing operation is complete (step S114). If the robot controller 70 determines in step S112 that the tube is to be cleaned (Yes), the tube is cleaned (step S113), and then step S114 is performed. If the paint changing operation is complete, the flow proceeds to step S2. Thereafter, processes or operations similar to the processes or operations in the flow of FIG. 16 are performed.

Modification

Figure 19:
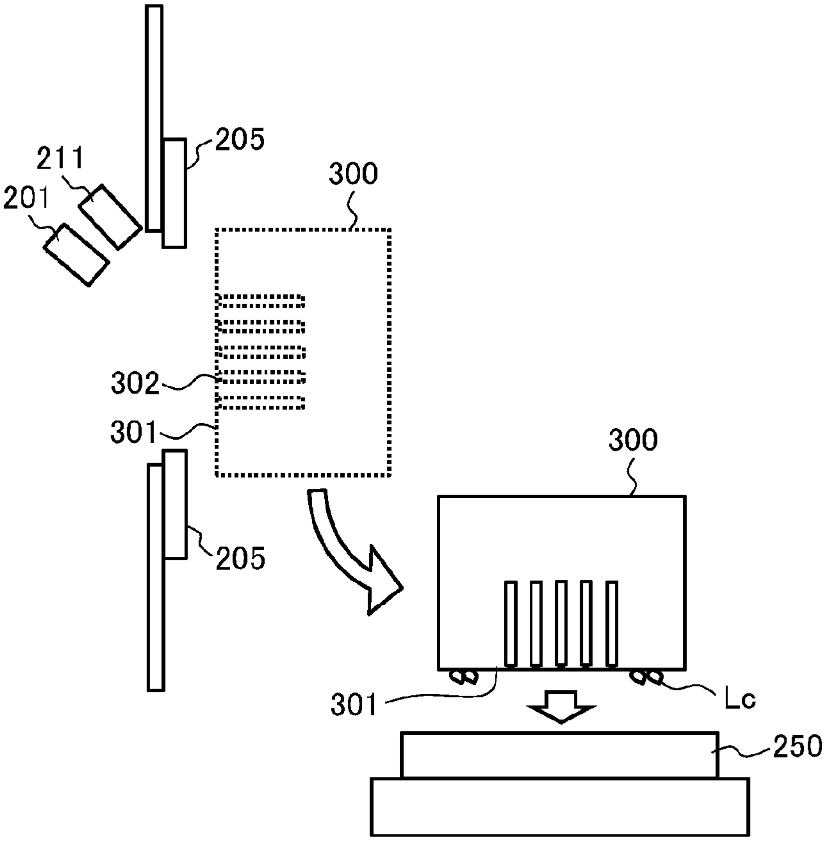
FIG. 19 is an explanatory view illustrating a modification of a cleaning-liquid removal configuration.

A modification of the present embodiment will be described with reference to FIG. 19. FIG. 19 is an explanatory view illustrating a modification of the cleaning-liquid removal configuration.

The present modification replaces the process of FIG. 12E. In FIG. 12E, the cleaning air Ac is re-discharged from the air nozzle 211 to the nozzle face 301 to blow off the cleaning liquid Lc and the others remaining on the nozzle face 301. The present modification, however, is different in that a liquid absorber 250 is disposed at a position different from the position of the air nozzle 211 in the cleaning station 2000 or the coating booth 1.

That is, as illustrated in FIG. 12D, after the nozzle face 301 is separated from the sealing member 205 by a predetermined distance, as illustrated in FIG. 19, the head 300 first turns 90 degrees to cause the nozzle face 301 to face downward in the vertical direction.

Subsequently, the nozzle face 301 is pressed against the liquid absorber 250. As a result, the liquid absorber 250 absorbs the cleaning liquid Lc remaining on the nozzle face 301 due to the capillary phenomenon of the liquid absorber 250. The liquid absorber 250 is preferably replaceable because the absorbability is deteriorated due to excessive accumulation of the cleaning liquid Lc and others. In the case of the present modification, the liquid absorber 250 is brought into contact with the nozzle face 301 to remove the cleaning liquid Lc and the others. Thus the removal effect is excellent, and scattering of the cleaning liquid and the others to the surroundings can be reduced.

As described above, in the present modification, the liquid absorber 250 that can absorb liquid is provided instead of the air nozzle 211. With this arrangement, the liquid absorber 250 is brought into contact with the nozzle face 301 to remove the cleaning liquid Lc and the others. Thus scattering of the cleaning liquid and the others to the surroundings can be reduced.

[Supplement]

In the present embodiment, the liquid may be, for example, a solution, a suspension, or an emulsion containing a solvent such as water or an organic solvent; a colorant such as a dye or a pigment; a function-imparting material such as a polymerizable compound, a resin, or a surfactant; a biocompatible material such as deoxyribonucleic acid (DNA), amino acid, protein, or calcium; or an edible material such as a natural pigment. The liquid may contain fine powder such as metal powder. Such a liquid can be used for, for example, inkjet ink, paint for coating, surface treatment liquid, constituent elements of electronic elements and light emitting elements, liquid for forming electronic-circuit resist patterns, material liquid for three-dimensional modeling.

The above description is merely an example, and thus the present embodiment has unique effects for each of the aspects below.

According to a first aspect, provided are: a head including: a nozzle that discharges liquid; a liquid chamber in communication with the nozzle through a communication port; a nozzle face provided with the nozzle; and a valve member (e.g., the valve 305) that opens or closes the communication port; and a cleaner (e.g., the cleaning nozzle 201, the air nozzle 211, the tube 202, and the tube 212) including a cleaning nozzle that supplies a cleaning liquid to the nozzle face, in which the cleaning liquid is supplied to the nozzle face with the valve member keeping the communication port closed.

According to the first aspect, provided can be a liquid discharge system allowing reduction in entry of the cleaning liquid into the head.

According to a second aspect, in the first aspect, in cleaning, the cleaning nozzle is disposed at a position out of a normal line (e.g., the broken line in FIG. 8A) extending from a center of the nozzle.

According to a third aspect, in the first or second aspect, the nozzle face is disposed intersecting a horizontal plane, and the cleaning nozzle is disposed above a perpendicular line of the nozzle face in a direction of gravity.

According to the second and third aspects, the liquid does not hit the cleaning nozzle, resulting in prevention of contamination of the cleaning nozzle.

According to a fourth aspect, in any one of the first to third aspects, for a change of the liquid in type, the cleaner cleans the nozzle face after the liquid remaining in the nozzle is discharged before the change.

According to the fourth aspect, the liquid change processing can be performed with a small number of times of cleaning.

According to a fifth aspect, in any one of the first to fourth aspects, further provided is a sealing member allowing formation of a sealed portion to the nozzle face.

According to the fifth aspect, scattering of the cleaning liquid around the cleaner can be prevented.

According to a sixth aspect, in the fifth aspect, provided are: a first cleaning-liquid remover (e.g., the cleaning nozzle 201) that removes the cleaning liquid supplied to the nozzle face with the sealed portion formed to the nozzle face; and a second cleaning-liquid remover (e.g., the air nozzle 211) that removes the cleaning liquid supplied to the nozzle face with the sealed portion not formed to the nozzle face.

According to a seventh aspect, in the sixth aspect, the second cleaning-liquid remover (e.g., the air nozzle 211) blows air (e.g., the cleaning air Ac) to the nozzle face.

According to the sixth and seventh aspects, no removal of the cleaning liquid from the nozzle face can be reduced.

According to an eighth aspect, in the sixth aspect, the second cleaning-liquid remover serves as an absorber (e.g., the liquid absorber 250) that absorbs the liquid.

According to the eighth aspect, the absorber is brought into contact with the nozzle face to remove the cleaning liquid and others. Thus scattering of the cleaning liquid and the others to the surroundings can be reduced.

Aspect 1

A liquid discharge system includes: a head including: a nozzle from which a liquid is to be discharged; a liquid chamber communicating with the nozzle through a communication port; a nozzle face on which the nozzle is formed; and a valve configured to open or close the communication port; and a cleaner including a cleaning nozzle to supply a cleaning liquid to the nozzle face, wherein the cleaner supplies the cleaning liquid from the cleaning nozzle to the nozzle face in a state where the valve has closed the communication port.

Aspect 2

In the liquid discharge system according to aspect 1, the cleaning nozzle is shifted from a normal line normal to the nozzle face and extending from a center of the nozzle when the cleaner cleans the nozzle face.

Aspect 3

In the liquid discharge system according to aspect 1 or 2, the nozzle face intersects a horizontal plane, and the cleaning nozzle is above a line orthogonal to an upper end of the nozzle face in a direction of gravity.

Aspect 4

In the liquid discharge system according to any one of aspects 1 to 3, in response to a change of a type of the liquid, the cleaner cleans the nozzle face after discharging the liquid before change and remaining in the nozzle.

Aspect 5

In the liquid discharge system according to any one of aspects 1 to 4, further includes: a sealing member configured to contact the nozzle face to form a sealed portion with the nozzle face.

Aspect 6

In the liquid discharge system according to aspect 5, the cleaner discharges the cleaning liquid from the cleaning nozzle onto the nozzle face in a state where the sealed portion is formed between the sealing member and the nozzle face.

Aspect 7

In the liquid discharge system according to aspect 6, further includes: a cleaning-liquid remover configured to remove the cleaning liquid discharged from the cleaning nozzle onto the nozzle face, wherein the cleaning-liquid remover configured to: remove the cleaning liquid on the nozzle face in a state where the sealed portion is formed between the sealing member and the nozzle face; and remove the cleaning liquid on the nozzle face in a state where the sealed portion is not formed between the sealing member and the nozzle face.

Aspect 8

In the liquid discharge system according to aspect 7, the cleaning-liquid remover blows air to the nozzle face to remove the cleaning liquid on the nozzle face.

Aspect 9

The liquid discharge system according to aspect 1, further includes: a cleaning-liquid remover configured to remove the cleaning liquid discharged from the cleaning nozzle onto the nozzle face, wherein the cleaning-liquid remover includes an absorber configured to contact the nozzle face and absorb the liquid on the nozzle face.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

CROSS-REFERENCE TO RELATED APPLICATIONS

This patent application is based on PCT filing PCT/IB2023/052058, filed on Mar. 6, 2023, which claims priority to Japanese Patent Application No. 2022-046210, filed on Mar. 23, 2022, in the Japan Patent Office, the entire disclosure of each is hereby incorporated by reference herein.

REFERENCE SIGNS LIST

3000 Coating system
1000 Coating robot
100 Head unit
300 Head
301 Nozzle face
302 Nozzle
305 Valve
2000 Cleaning station
201 Cleaning nozzle
211 Air nozzle
205 Sealing member
206 Sealed portion
5000 Target object
Lc Cleaning liquid
Ac Cleaning air

The invention claimed is:

1. A liquid discharge system comprising:
a head including:
a nozzle face including a plurality of nozzles, wherein a liquid is to be discharged from the plurality of nozzles;
a plurality of communication ports respectively communicating with the plurality of nozzles;
a liquid chamber communicating with the plurality of nozzles through the plurality of communication ports;
a plurality of valves to open or close the plurality of communication ports; and
a cleaner including a cleaning nozzle to supply a cleaning liquid to the nozzle face, wherein the cleaner supplies the cleaning liquid from the cleaning nozzle to the nozzle face in a state where the plurality of valves have closed the plurality of communication ports.

2. The liquid discharge system according to claim 1, wherein the cleaning nozzle is shifted from a normal line normal to the nozzle face and extending from a center of the plurality of nozzles when the cleaner cleans the nozzle face.

3. The liquid discharge system according to claim 1, wherein:

the nozzle face intersects a horizontal plane, and the cleaning nozzle is above a line orthogonal to an upper end of the nozzle face in a direction of gravity.

4. The liquid discharge system according to claim 1, wherein:

in response to a change of a type of the liquid, the cleaner cleans the nozzle face after discharging the liquid before the change and remaining in the plurality of nozzles.

5. The liquid discharge system according to claim 1, further comprising:

a seal to contact the nozzle face to form a sealed portion with the nozzle face.

6. The liquid discharge system according to claim 5, wherein:

the cleaner discharges the cleaning liquid from the cleaning nozzle onto the nozzle face in a state where the sealed portion is formed between the seal and the nozzle face.

7. The liquid discharge system according to claim 6, further comprising:

a cleaning-liquid remover to:

remove the cleaning liquid discharged from the cleaning nozzle onto the nozzle face;

remove the cleaning liquid on the nozzle face in a state where the sealed portion is formed between the seal and the nozzle face; and remove the cleaning liquid on the nozzle face in a state where the sealed portion is not formed between the seal and the nozzle face.

8. The liquid discharge system according to claim 7, wherein the cleaning-liquid remover blows air to the nozzle face to remove the cleaning liquid on the nozzle face.

9. The liquid discharge system according to claim 7, wherein: the cleaning-liquid remover discharges air from an air nozzle to the nozzle face while the sealed portion is formed, and the cleaning-liquid remover discharges air from the air nozzle to the nozzle face a second time after the sealed portion is released.

10. The liquid discharge system according to claim 1, further comprising:

a cleaning-liquid remover to remove the cleaning liquid discharged from the cleaning nozzle onto the nozzle face, wherein the cleaning-liquid remover includes an absorber to contact the nozzle face and absorb the liquid on the nozzle face.

11. The liquid discharge system according to claim 1, wherein: each of the plurality of valves has a leading end provided with an elastic member configured to contact the nozzle face and close a corresponding communication port of the plurality of communication ports.

12. The liquid discharge system according to claim 1, wherein: the head comprises a plurality of valve mechanisms respectively including the plurality of valves, and each of the plurality of valve mechanisms includes a piezoelectric element configured to drive a corresponding valve of the plurality of valves to open or close the corresponding communication port.

13. The liquid discharge system according to claim 12, wherein: each of the plurality of valve mechanisms further comprises a holding member having a central space holding the piezoelectric element, and the holding member includes a leading end portion coupled to the corresponding valve.

14. The liquid discharge system according to claim 12, wherein each of the plurality of valve mechanisms further comprises: a bearing portion provided between the corresponding valve and a housing of the head; and a seal member provided between the bearing portion and the corresponding valve.

15. The liquid discharge system according to claim 1, wherein: the cleaning nozzle is configured as a charging conical nozzle, a linear nozzle, or a fan-shaped nozzle.

16. The liquid discharge system according to claim 1, further comprising: a coating robot including a robot arm, wherein the head is provided at a leading end of the robot arm.

17. The liquid discharge system according to claim 16, wherein: the cleaner is provided in a cleaning station, and the cleaning station and the coating robot are independent in structure.

18. The liquid discharge system according to claim 1, wherein: the head further includes a plurality of liquid supply ports respectively disposed near the plurality of nozzles to supply the liquid to a rear portion of the nozzle face, and the plurality of liquid supply ports are configured to receive the liquid in an externally pressurized state.

19. The liquid discharge system according to claim 1, wherein: the liquid comprises a paint, and the liquid discharge system is a coating system configured to coat a vehicle body.

20. The liquid discharge system according to claim 1, wherein the head is a valve head employing an inkjet system.

* * * * *